US012769508B2

(12) United States Patent
Lim

(10) Patent No.: US 12,769,508 B2
(45) Date of Patent: Oct. 20, 2026

(54) REMOTE CONTROL STATION, SYSTEM AND METHOD FOR AUTOMATICALLY CONTROLLING AN AIRCRAFT

(71) Applicants: Hyundai Motor Company, Seoul (KR); Kia Corporation, Seoul (KR)

(72) Inventor: Jun Young Lim, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 154 days.

(21) Appl. No.: 18/757,885

(22) Filed: Jun. 28, 2024

(65) Prior Publication Data

US 2025/0130764 A1 Apr. 24, 2025

(30) Foreign Application Priority Data

Oct. 20, 2023 (KR) ........................ 10-2023-0141458

(51) Int. Cl.

| | |
|---|---|
| ***G10L 15/22*** | (2006.01) |
| ***G06F 3/16*** | (2006.01) |
| ***G06F 40/40*** | (2020.01) |
| ***G08G 5/22*** | (2025.01) |
| ***G08G 5/26*** | (2025.01) |

(Continued)

(52) U.S. Cl.
CPC .............. *G06F 3/167* (2013.01); *G06F 40/40* (2020.01); *G08G 5/22* (2025.01); *G08G 5/26* (2025.01); *G08G 5/55* (2025.01); *G08G 5/56* (2025.01); *G08G 5/58* (2025.01)

(58) Field of Classification Search
CPC . G08G 5/00; G08G 5/265; G08G 5/57; G06F 40/20; G10L 15/22
See application file for complete search history.

(56) References Cited

U.S. PATENT DOCUMENTS 7,129,887 B2 * 10/2006 Mitchell ................ G08G 5/727
342/36
9,401,758 B2 7/2016 Bosworth
(Continued)

FOREIGN PATENT DOCUMENTS

JP 2019177711 A 10/2019
JP 2022186375 A 12/2022
(Continued)

OTHER PUBLICATIONS

Fusco, F. et al., "Feasibility Study for a Voice Relay Supporting ATC Operator Communications to the RPAS Ground Pilot", 23rd Conference of the Italian Association of Aeronautics and Astronautics, XP093195085, Nov. 19, 2015, 12 pages.
(Continued)

*Primary Examiner* — Daniel Abebe
(74) *Attorney, Agent, or Firm* — Slater Matsil, LLP

(57) ABSTRACT

In an embodiment a remote pilot station includes a communication device configured to communicate with an aircraft and an air traffic control tower configured to control the aircraft, and a processor configured to transmit status information of the aircraft to the air traffic control tower, convert a voice command received from the air traffic control tower into a command keyword, and control the communication device to transmit an instruction corresponding to the command keyword to the aircraft to remotely control the aircraft.

20 Claims, 8 Drawing Sheets

(51) Int. Cl.

| | |
|---|---|
| ***G08G 5/55*** | (2025.01) |
| ***G08G 5/56*** | (2025.01) |
| ***G08G 5/58*** | (2025.01) |

(56) References Cited

U.S. PATENT DOCUMENTS

| | | | | |
|---|---|---|---|---|
| 9,922,569 | B2 | 3/2018 | Bilek et al. | |
| 10,438,587 | B1 | 10/2019 | Lam | |
| 10,877,488 | B1 | 12/2020 | Liu et al. | |
| 12,277,862 | B1 | 4/2025 | Daniels, Jr. et al. | |
| 2003/0110028 | A1* | 6/2003 | Bush | G10L 15/22 704/E15.04 |
| 2008/0065275 | A1* | 3/2008 | Vizzini | G05D 1/0016 704/E15.045 |
| 2020/0258405 | A1* | 8/2020 | Fern | G08G 5/22 |
| 2022/0189316 | A1 | 6/2022 | Paul et al. | |
| 2022/0194576 | A1* | 6/2022 | Yang | G06F 40/40 |
| 2022/0380024 | A1 | 12/2022 | De Grancey et al. | |
| 2023/0208506 | A1* | 6/2023 | Ji | G08G 5/25 |
| 2023/0245571 | A1* | 8/2023 | Casey | G08G 5/727 701/120 |
| 2023/0334991 | A1* | 10/2023 | Shapiro | G10L 15/22 |
| 2024/0096222 | A1 | 3/2024 | Healy et al. | |
| 2024/0242617 | A1 | 7/2024 | Rosenkranz et al. | |
| 2024/0248481 | A1 | 7/2024 | George et al. | |
| 2025/0104691 | A1 | 3/2025 | Kolcarek et al. | |

FOREIGN PATENT DOCUMENTS

| | | | |
|---|---|---|---|
| KR | 101073042 | B1 | 10/2011 |
| KR | 101119175 | B1 | 3/2012 |

OTHER PUBLICATIONS

Bouwmeester, L. et al., “Autonomous Communication Between Air Traffic Control and Remotely Piloted Aircraft,” 16th Australian Aerospace Congress, Feb. 23-24, 2015, 11 pages.

* cited by examiner

REMOTE CONTROL STATION, SYSTEM AND METHOD FOR AUTOMATICALLY CONTROLLING AN AIRCRAFT

CROSS-REFERENCE TO RELATED APPLICATIONS

This application claims the benefit of Korean Patent Application No. 10-2023-0141458, filed on Oct. 20, 2023, which application is hereby incorporated herein by reference.

TECHNICAL FIELD

The present disclosure relates to a remote pilot station, an automatic control system for an aircraft, and a method therefor, and more specifically, to a technique capable of automatically controlling an aircraft through communication between a remote pilot station and an air traffic control tower.

BACKGROUND

Control of an existing aircraft has been mainly carried out through voice communication between a pilot operating the aircraft and an air traffic controller. At each stage of flight, such as airport departure, approach, cruising, etc., the pilot flies by receiving commands from a control facility (control tower) around the aircraft through communication with the control facility and changing a flight path or flight speed of the aircraft.

In the past, a pilot of an aircraft directly communicated with a control manager of control facility through voice, so the workload of the pilot and the control manager was large, and accidents due to errors during voice communication were frequent.

Furthermore, in a case of unmanned aerial vehicles or autonomous aircraft, they are remotely controlled by a remote pilot station (RPS), and conventionally, control of the unmanned aerial vehicles or autonomous aircrafts was difficult as control was achieved through direct communication between a control manager of a general airport control tower (CT) and the pilot of the aircraft.

Furthermore, in a case where one remote pilot station remotely controls multiple aircraft, control becomes more difficult.

SUMMARY

An exemplary embodiment of the present disclosure attempts to provide a remote pilot station, an automatic control system for an aircraft, and a method therefor, configured for automatically controlling an aircraft by performing communication between an air traffic control tower and a remote pilot station which automatically controls the aircraft.

An exemplary embodiment of the present disclosure attempts to provide a remote pilot station, an automatic control system for an aircraft, and a method therefor, configured for minimizing a communication delay and a human error caused by human voice communication and minimizing a control time during control of an aircraft by automatically generating voice information through natural language processing (NLP) and transmitting it to an air traffic control tower in the remote pilot station and by converting the voice information received from the air traffic control tower into data information and transmitting it to the aircraft.

Furthermore, an exemplary embodiment of the present disclosure attempts to provide a remote pilot station, an automatic control system for an aircraft, and a method therefor, configured for efficiently controlling multiple aircraft based on direct communication with the air traffic control tower in response to a case where multiple aircraft are controlled by one remote pilot station.

The technical objects of the present disclosure are not limited to the objects mentioned above, and other technical objects not mentioned may be clearly understood by those skilled in the art from the description of the claims.

An exemplary embodiment of the present disclosure provides a remote pilot station including: a communication device configured to communicate with an aircraft and an air traffic control tower which controls the aircraft; and a processor configured to transmit status information of the aircraft to the air traffic control tower, and to convert a voice command received from the air traffic control tower into a command keyword and control a communication device to transmit an instruction corresponding to the command keyword to the aircraft to remotely control the aircraft.

In an exemplary embodiment of the present disclosure, the processor may be configured to convert status information of the aircraft into voice information based on a natural language processing technique to transmit it to the air traffic control tower.

In an exemplary embodiment of the present disclosure, the processor may be configured, to control the communication device to transmit the status information of the aircraft, including voice information and data information, to the air traffic control tower.

In an exemplary embodiment, the method may further include an interface device configured to display the command keyword on a screen.

In an exemplary embodiment of the present disclosure, the interface device is configured to receive an instruction from a remote pilot.

In an exemplary embodiment of the present disclosure, the processor may be configured to convert the instruction received from the remote pilot station into voice information and to control the communication device to transmit it to the air traffic control tower.

In an exemplary embodiment of the present disclosure, the processor may be configured, to monitor a status of the aircraft by receiving status information of the aircraft from the aircraft at predetermined intervals.

In an exemplary embodiment of the present disclosure, the processor may be configured to communicate with the air traffic control tower to request that the air traffic control tower performs priority control of the aircraft in which the emergency situation has occurred in response to a case where an emergency situation occurs in the aircraft.

In an exemplary embodiment of the present disclosure, the processor may be configured, in response to satisfying at least one of a section requiring air traffic control, a section where air traffic control communication is possible for the air traffic control tower, and a communication request for the air traffic control tower, to start a logic for controlling the aircraft.

An exemplary embodiment of the present disclosure provides an automatic control system for an aircraft, including: the aircraft; and a remote pilot station configured to remotely control the aircraft based on communication with an air traffic control tower, wherein the remote pilot station is configured to transmit status information of the aircraft to the air traffic control tower, and to convert a voice command received from the air traffic control tower into a command keyword and transmit an instruction corresponding to the command keyword to the aircraft.

In an exemplary embodiment of the present disclosure, the aircraft may include multiple aircraft, and in response to the case where one remote pilot station remotely controls the multiple aircraft, the remote pilot station may be configured to transmit an instruction for control to an aircraft designated as a control target among the multiple aircraft, and to control an aircraft which is not designated as a control target among the multiple aircraft to continue performing previous mission.

In an exemplary embodiment of the present disclosure, an aircraft which is not designated as a control target among the multiple aircraft may be configured to transmit status information thereof to the remote pilot station at predetermined intervals.

In an exemplary embodiment of the present disclosure, the remote pilot station may be configured to display status information of an aircraft which is not designated as a control target among the plurality of aircraft on a screen, and to transmit the status information of the aircraft which is not designated as a control target among the plurality of aircraft to the air traffic control tower.

In an exemplary embodiment of the present disclosure, the remote pilot station may be configured, in response to a case where the aircraft which is not designated as a control target among the multiple aircraft, the processor may be configured to control an aircraft which is not able to continue performing the previous mission according to airport control regulations.

In an exemplary embodiment of the present disclosure, the remote pilot station may be configured, in the event of an emergency situation with an aircraft which is not designated as a control target among the multiple aircraft, to request the air traffic control tower to preferentially control the aircraft in which the emergency situation has occurred.

In an exemplary embodiment of the present disclosure, the remote pilot station may be configured to determine control priority of the multiple aircraft based on status information of the multiple aircraft.

An exemplary embodiment of the present disclosure provides an automatic control method for an aircraft, including: receiving, by a processor, status information of the aircraft from the aircraft; transmitting, by the processor, the status information of the aircraft to an air traffic control tower which controls the aircraft; converting, by the processor, a voice command received from the air traffic control tower into a command keyword; and transmitting, by the processor, an instruction corresponding to the command keyword to the aircraft.

In an exemplary embodiment of the present disclosure, the transmitting to the air traffic control tower may include converting, by the processor, the status information of the aircraft into voice information based on a natural language processing technique to transmit it to the air traffic control tower.

In an exemplary embodiment of the present disclosure, it may further include: displaying, by the processor, the command keyword on a screen; and receiving, by the processor, an instruction matching the command keyword from a remote pilot.

In an exemplary embodiment of the present disclosure, it may further include converting, by the processor, the instruction transmitted to the aircraft into voice information and transmitting it to the air traffic control tower.

According to the present technique, an aircraft may be automatically controlled by performing communication between an air traffic control tower and a remote pilot station which automatically controls the aircraft.

Furthermore, according to the present technique, it may be possible to minimize a communication delay and a human error caused by human voice communication and to minimize a control time during control of an aircraft, it may be possible to reduce airport congestion, and it may be possible to minimize work fatigue of a control manager and a remote pilot, by automatically generating voice information through natural language processing (NLP) and transmitting it to an air traffic control tower in a remote pilot station and by converting the voice information received from the air traffic control tower into data information and transmitting it to the aircraft.

Furthermore, according to the present technique, information needed by a control manager of an air traffic control tower may be displayed on a screen by transmitting and receiving not only voice information but also data information between the control manager and the remote pilot station, minimizing human error through voice communication.

Furthermore, according to the present technique, multiple aircraft may be efficiently controlled based on direct communication with the air traffic control tower in response to a case where multiple aircraft are controlled by one remote pilot station.

Furthermore, various effects which may be directly or indirectly identified through the present specification may be provided.

DETAILED DESCRIPTION OF ILLUSTRATIVE EMBODIMENTS

Figure 1:
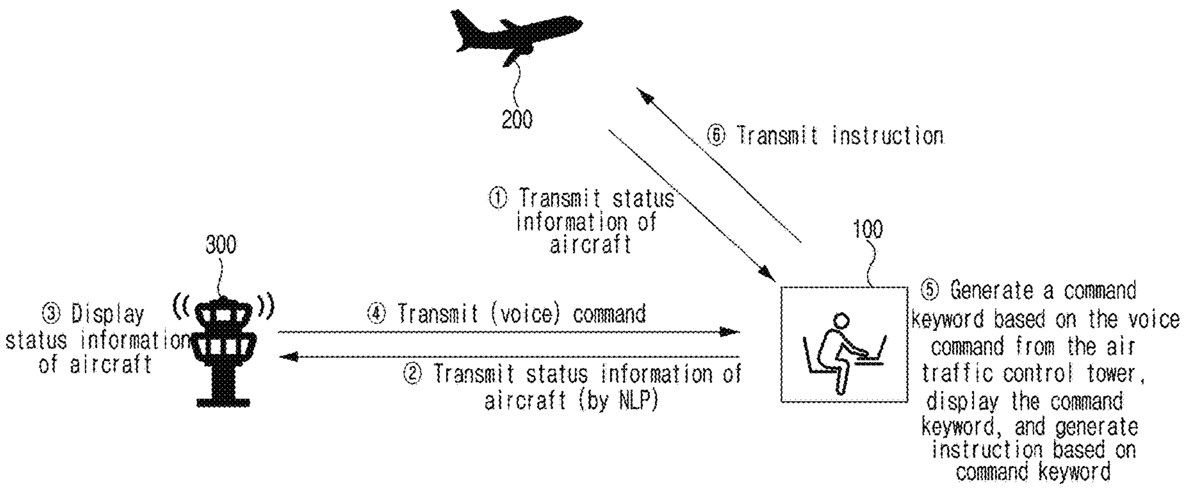
FIG. 1 illustrates an example of a configuration of an automatic control system for an aircraft.

Hereinafter, some exemplary embodiments of the present disclosure will be described in detail with reference to exemplary drawings. It should be noted that in adding reference numerals to constituent elements of each drawing, the same constituent elements include the same reference numerals as possible even though they are indicated on different drawings. In describing an exemplary embodiment of the present disclosure, when it is determined that a detailed description of the well-known configuration or function associated with the exemplary embodiment of the present disclosure may obscure the gist of the present disclosure, it will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms include the same meanings as those which are generally understood by those skilled in the technical field of the disclosure to which an exemplary embodiment of the present disclosure pertains (those skilled in the art) unless they are differently defined. Terms defined in a generally used dictionary shall be construed to include meanings matching those in the context of a related art, and shall not be construed to include idealized or excessively formal meanings unless they are clearly defined in the present specification.

Hereinafter, various exemplary embodiments of the present disclosure will be described in detail with reference to FIG. 1 to FIG. 8.

Figure 2:
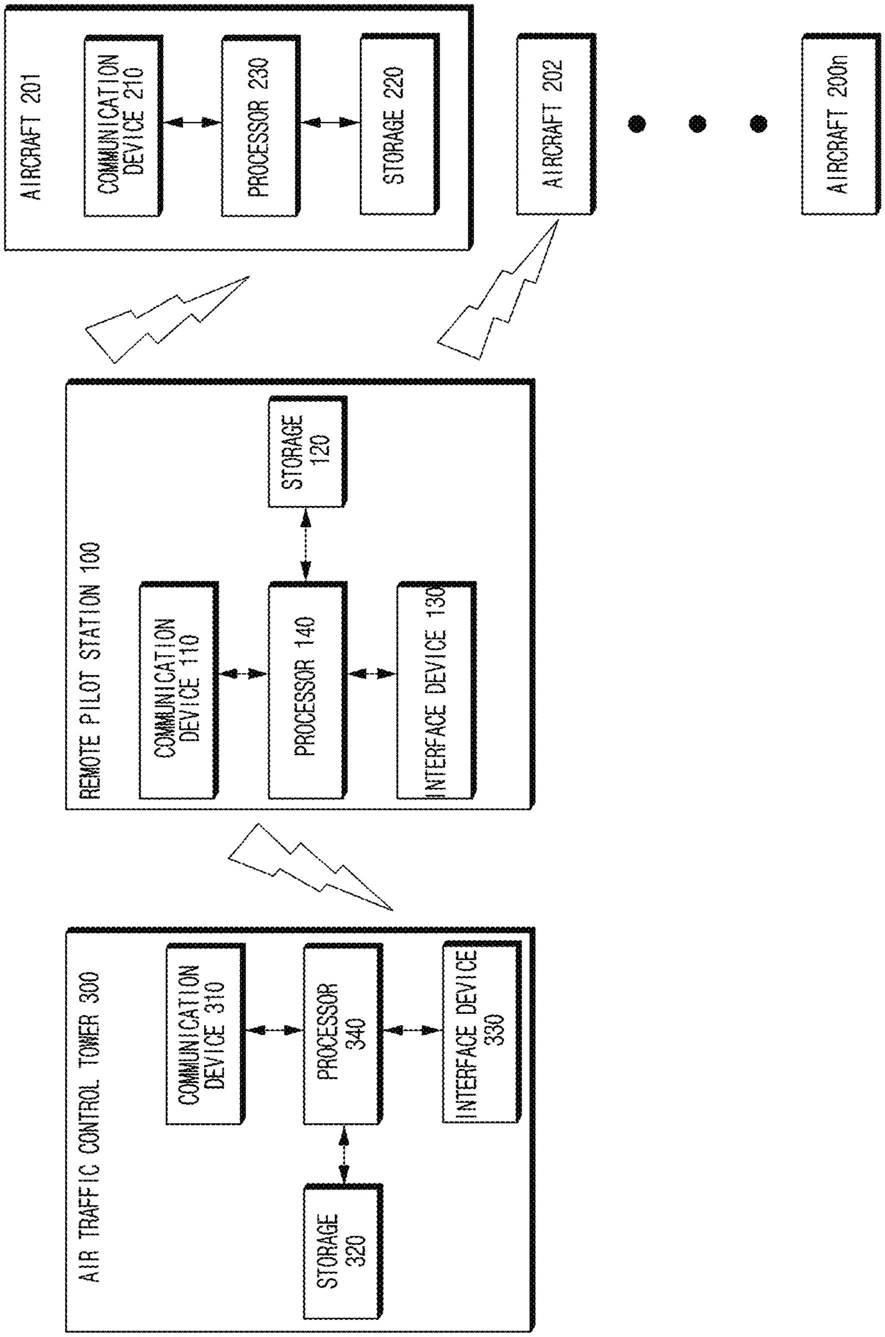
FIG. 2 illustrates a block diagram showing an example configuration of an automatic control system for an aircraft.

FIG. 1 illustrates an example of a configuration of an automatic control system for an aircraft, and FIG. 2 illustrates a block diagram showing an example configuration of an automatic control system for an aircraft.

Referring to FIG. 1, an aircraft automatic control system according to an exemplary embodiment of the present disclosure may include a remote pilot station 100, an aircraft 200, and an air traffic control tower 300.

The aircraft automatic control system according to the present disclosure may be configured to automate control of the aircraft 200 through communication between the air traffic control tower 300 and the remote pilot station 100, which remotely controls the aircraft 200.

Figure 3:
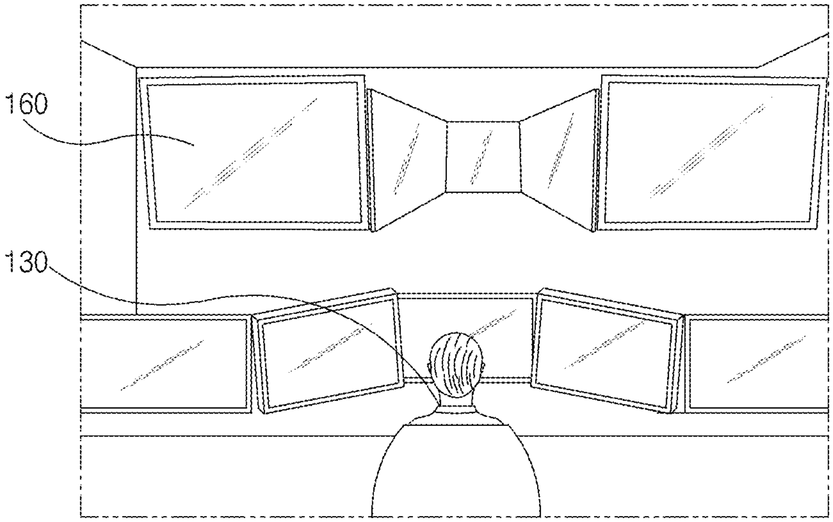
FIG. 3 illustrates an example screen of a remote pilot station.

The remote pilot station 100 may be configured to remotely control the aircraft 200 from a remote position. That is, the remote pilot station 100 may be configured to remotely control the vehicle 200 by transmitting commands to the vehicle 200 based on data communication, and may be configured to control, e.g., takeoff, landing, and circling. The remote pilot station 100 may be implemented as a Remote Pilot Station (RPS), and as illustrated in FIG. 3, a remote pilot 160 may check an image in front of the aircraft 200 through the interface device 130. FIG. 3 illustrates an example screen of a remote pilot station.

The aircraft 200 may include a first kind of air mobility vehicle that has occupants, including pilots and passengers, on board and may fly autonomously or semi-autonomously, and a second kind of air mobility vehicle that may fly autonomously by external control or program without occupants on board. Specifically, the aircraft 200 may include a helicopter, a drone, an airplane, or a vehicle that may be configured to move with wheels on the ground and to fly in the air, and as mentioned earlier, these may include both manned and unmanned cases. The aircraft 200 may be implemented as a Remote Pilot Aircraft (RPA).

The air traffic control tower 300 may be configured to communicate with the remote pilot station 100, and in particular, may be configured to transmit a voice command to the remote pilot station 100 and to receive status information (voice information and data information) of the aircraft 200 from the remote pilot station 100. In the instant case, the control manager in the air traffic control tower 300 and a pilot of the remote pilot station 100 may communicate by voice, and may communicate status information of the aircraft 200 and control commands of the aircraft 200 by voice. Furthermore, the remote pilot station 100 may be configured to convert the status information of the aircraft 200 into voice information through Natural Language Processing (NLP) to transmit it to the air traffic control tower 300, and may be configured to convert a voice command which is a voice of the control manager, received from the air traffic control tower 300 into a command keyword which is data information through the NLP.

Figure 4:
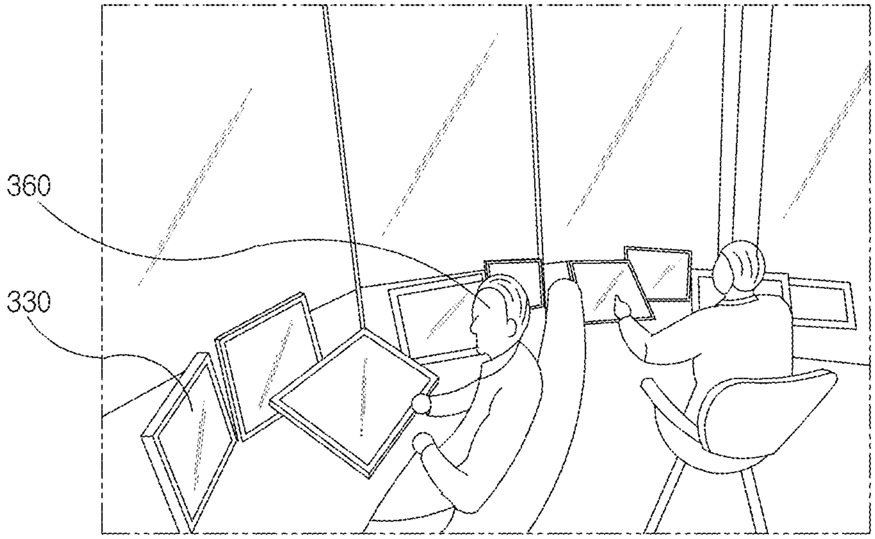
FIG. 4 illustrates an example screen of an air traffic control tower.

The air traffic control tower 300 may be implemented as an Air Traffic Control Tower (ATCT), and a control manager 360 may check the status information of the aircraft 200 through the interface device 330 as illustrated in FIG. 4. FIG. 4 illustrates an example screen of the air traffic control tower 300.

The aircraft 200 may be configured to transmit status information (data information) of the aircraft 200 to the remote pilot station 100 based on wireless communication (①). In the instant case, the status information of the aircraft 200 may include driving modes such as a landing mode and a tour mode, a fuel status of the vehicle 200, and whether there is a defect.

Furthermore, the remote pilot station 100 may be configured to convert the status information (data information) of the aircraft 200 into voice information based on the NLP (Natural Language Processing) to transmit it to the air traffic control tower 300 (②).

Accordingly, the air traffic control tower 300 may be configured to display the status information of the aircraft 200 on a screen so that the control manager may check it (③). In the instant case, the air traffic control tower 300 may be configured to output status information of the aircraft 200 through a speaker.

Furthermore, the air traffic control tower 300 may be configured to transmit a voice command according to the status information of the aircraft 200 to the remote pilot station 100 (④). In the instant case, the air traffic control tower 300 may be configured to receive a voice command from the air traffic controller and to transmit it to the remote pilot station 100. That is, at the air traffic control tower 300, the control manager may check the status information of the aircraft 200 and then output a command by voice, and the air traffic control tower 300 may be configured to transmit the voice command inputted by the control manager to the remote pilot station 100.

In response to the voice command being received from the air traffic control tower 300, the remote pilot station 100 may be configured to generate a command keyword based on the voice command and to display the command keyword on a screen so that a remote pilot may check it. Next, the remote pilot station 100 may be configured to generate an instruction corresponding to the command keyword (⑤). That is, a remote pilot of the remote pilot station 100 may check the command keyword displayed on the screen and generate a command corresponding thereto.

Thereafter, the remote pilot station 100 may be configured to transmit the instruction to the aircraft 200 (⑥).

The aircraft 200 may be controlled according to instructions received from the remote pilot station 100. Furthermore, the remote pilot station 100 and the air traffic control tower 300 may be configured to communicate with each other to transmit and receive emergency situation information in an emergency situation.

The above-described steps ① to ⑥ may be repeated until ends of a section requiring air traffic control and a section where communication with the air traffic control tower is possible. In the instant case, a section requiring air traffic control and a section where communication with the air traffic control tower is possible may be determined in advance by aviation laws or airport laws.

Accordingly, according to the present disclosure, human error may be minimized by transmitting and receiving data information (e.g. text) as well as voice information performing communication between the remote pilot station 100 and the air traffic control tower 300, and by converting the voice information received from the air traffic control tower 300 by the aircraft 200 into data information and transmitting it to the remote pilot station 100.

Furthermore, according to the present disclosure, communication delay may be minimized and problem situation may be minimized by allowing the remote pilot station 100 and the air traffic control tower 300 to communicate directly without going through the aircraft 200.

Referring to FIG. 2, the remote pilot station 100 may include a communication device 110, a storage 120, an interface device 130, and a processor 140. According to an exemplary embodiment of the present disclosure, the remote pilot station 100 may be implemented as a single unit by coupling components with each other, and some components may be omitted, based on an implementation method thereof.

The communication device 110 may perform wireless communication with each of the air traffic control tower 300 and the aircraft 200. As an exemplary embodiment of the present disclosure, the communication device 110 may be configured to receive status information from the aircraft 200, and may be configured to transmit an instruction to the aircraft 200. Furthermore, the communication device 110 may be configured to transmit status information from the aircraft 200 to the air traffic control tower 300 and to receive a voice command from the air traffic control tower 300. In the instant case, the communication device 110 may be configured to receive data in a text form along with the voice command, and may be configured to transmit the received data to the interface device 130 to display the received data (e.g., the voice command in the text form).

The communication device 110, which is a hardware device implemented with various electronic circuits to transmit and receive signals through a wired connection, may be configured to transmit and receive information with each device in the remote pilot station 100 based on a network communication technique, and may be configured to perform wireless communication with the air traffic control tower 300 and the aircraft 200.

The storage 120 may be configured to store data and/or algorithms necessary for the processor 140 to operate, and as an exemplary embodiment of the present disclosure, may be configured to store data transmitted and received from the aircraft 200

For example, information such as a voice command received from the air traffic control tower 300 may be stored.

The interface device 130 may be configured to output data for remote control of the aircraft 200, and may be configured to receive instructions for being manipulated by a remote pilot for remote control of the aircraft 200. As an exemplary embodiment of the present disclosure, the interface device 130 may be configured to display a command keyword corresponding to a voice command received from the air traffic control tower 300 so that a remote pilot may check it.

The processor 140 may be electrically connected to the communication device 110, the storage 120, the interface device 130, and the like, may electrically control each component, and may be an electrical circuit that executes software commands, thereby performing various data processing and calculations described below.

The processor 140 may be configured to process a signal transferred between components of remote pilot station 100 to perform overall control such that each component may perform its function normally. The processor 140 may be implemented in the form of hardware, software, or a combination of and software. For example, the processor 140 may be implemented as a microprocessor, but the present disclosure is not limited thereto.

The processor 140 may include an air traffic control recognition & converter module configured to convert a command, which is voice information received from the air traffic control tower 300, into data for data communication, and a flight control converter configured to convert an instruction of the remote pilot station 100 into voice information. Furthermore, the processor 230 may control the command information converted into the voice information based on the flight control converter to be transmitted to the air traffic control tower 300 through the communication device 110.

The processor 140 may be configured to transmit status information of the aircraft 200 to the air traffic control tower 300, and may be configured to converts a voice command received from the air traffic control tower 300 into a command keyword and to control the communication device 110 to transmit an instruction corresponding to the command keyword to the aircraft 200, remotely controlling the aircraft 200.

The processor 140 may be configured to convert status information of the aircraft 200 into voice information based on the natural language processing technique to transmit it to the air traffic control tower 300.

The processor 140 may be configured to control the communication device 110 to transmit the status information of the aircraft 200, including both voice information and data information, to the air traffic control tower 300.

The processor 140 may be configured to control the communication device 110 to convert the instruction transmitted to the aircraft 200 into voice information and to transmit it to the air traffic control tower 300.

The processor 140 may be configured to monitor a status of the aircraft 200 by receiving status information of the aircraft 200 from the aircraft 200 at predetermined intervals.

In response to a case where an emergency situation occurs in the aircraft 200, the processor 140 may be configured to communicate with the air traffic control tower 300 to request the air traffic control tower 300 to preferentially perform control of the aircraft in which the emergency situation has occurred.

The processor 140 may be configured to start a logic for controlling the aircraft 200 in response to satisfying at least one of a section requiring air traffic control, a section where air traffic control communication is possible for the air traffic control tower, and a communication request for the air traffic control tower. Furthermore, the processor 140 may be configured to end a logic for the control of the aircraft 200 in response to ending of the section requiring air traffic control and the section where the air traffic control communication is possible for the air traffic control tower. In the instant case, the section requiring air traffic control and the section where air traffic control communication is possible for the air traffic control tower may be determined in advance by aviation laws or airport laws.

In response to a case where multiple aircraft 201, 202, . . . , and 200*n* are remotely controlled by one remote pilot station 100, the processor 140 may be configured to transmit an instruction for control to the first aircraft 201 designated as a control target among the multiple aircraft 201, 202, . . . , and 200*n*, and may be configured to control the aircraft 202 and 203 which are not designated as control targets among them to continue performing previous missions.

In response to a case where the aircraft 202 and 203, which are not designated as control targets, are not able to continue to perform their previous missions among the multiple aircraft 201, 202, . . . , and 200*n*, the processor 140 may be configured to control an aircraft which is not able to continue performing its previous mission according to airport control regulations. In the instant case, the airport control regulations may include loitering missions over the airport.

In the event of an emergency situation with the second aircraft 202, which is not designated as a control target, the processor 140 may be configured to control the communication device 110 to request the air traffic control tower 300 to preferentially control the second aircraft 202 in which the emergency situation has occurred.

In response to a case where one remote pilot station 100 remotely controls a plurality of aircraft, the processor 140 may be configured to determine control priority of the aircraft 201, 202, . . . , and 200*n* based on status information of the multiple aircraft 201, 202, . . . , and 200*n*. In the instant case, the status information of the aircraft may include at least one of a driving mode of the aircraft, fuel status information, defect status, or a combination thereof.

The multiple aircraft 201, 202, . . . and 200*n* may each include a communication device 210, a storage 220, and a processor 230. According to an exemplary embodiment of the present disclosure, the aircraft 200 may be implemented as a single unit by coupling components with each other, and some components may be omitted, based on an implementation method thereof.

The communication device 210 is a hardware device implemented with various electronic circuits to transmit and receive signals through a wired connection, and may be configured to transmit and receive information based on in-vehicle devices and in-vehicle network communication techniques. As an exemplary embodiment of the present disclosure, the in-vehicle network communication techniques may include Controller Area Network (CAN) communication, Local Interconnect Network (LIN) communication, flex-ray communication, and the like.

Furthermore, the communication device 210 may be configured to perform wireless communication with the remote pilot station 100. As an exemplary embodiment of the present disclosure, the communication device 210 may be configured to receive an instruction from the remote pilot station 100.

The storage 220 may be configured to store data and/or algorithms necessary for the processor 230 to operate, and as an exemplary embodiment of the present disclosure, may be configured to store information received from the remote pilot station 100.

The processor 230 may be electrically connected to the communication device 210, the storage 220, and the like, may electrically control each component, and may be an electrical circuit that executes software commands, thereby performing various data processing and calculations described below.

The processor 230 may be configured to process a signal transferred between components of the aircraft 200 to perform overall control such that each of the components may perform its function normally. The processor 230 may be implemented in the form of hardware, software, or a combination of and software. For example, the processor 230 may be implemented as a microprocessor, but the present disclosure is not limited thereto.

The processor 230 may be configured to control the communication device 210 to periodically transmit status information of the aircraft 200 to the remote pilot station 100.

Furthermore, the processor 230 may be configured to control the aircraft 200 according to instructions received from the remote pilot station 100.

The air traffic control tower 300 may include a communication device 310, a storage 320, an interface device 330, and a processor 340. According to an exemplary embodiment of the present disclosure, the air traffic control tower 300 may be implemented as a single unit by coupling components with each other, and some components may be omitted, based on an implementation method thereof.

The communication device 310 may be configured to perform wireless communication with the remote pilot station 100. As an exemplary embodiment of the present disclosure, the communication device 310 may be configured to receive status information of the aircraft 201, 202, . . . , and 200*n* from the remote pilot station 100, and may be configured to transmit an instruction inputted by the control manager to the remote pilot station 100.

The storage 320 may store data and/or algorithms required for the processor 140 to operate, and the like. As an exemplary embodiment of the present disclosure, the storage 320 may store the status information of the aircraft 201, 202, . . . , and 200*n* received from the remote pilot station 100.

The interface device 330 may be configured to display the status information of the aircraft 201, 202, . . . , and 200*n* received from the remote pilot station 100, and a voice command may be inputted by the control manager.

The processor 340 may be electrically connected to the communication device 310, the storage 320, the interface device 330, and the like, may electrically control each component, and may be an electrical circuit that executes software commands, thereby performing various data processing and calculations described below.

The processor 340 may be configured to process a signal transferred between components of the air traffic control tower 300 to perform overall control such that each component may perform its function normally. The processor 340 may be implemented in the form of hardware, software, or a combination of and software. For example, the processor 340 may be implemented as a microprocessor, but the present disclosure is not limited thereto.

The processor 340 may be configured to monitor statuses of the aircraft 201, 202, . . . , and 200*n* based on the status information of the aircraft 201, 202, . . . , and 200*n* periodically received from the remote pilot station 100.

In response to a case where the status information of the aircraft 200 is received from the remote pilot station 100, the processor 340 may be configured to control the status information of the aircraft 200 to be displayed through the interface device 330.

In response to a case where a voice command is inputted by a control manager through the interface device 330, the processor 340 may be configured to control the communication device 310 such that the voice command is transmitted to the remote pilot station 100.

In response to a case where an emergency request is made from remote pilot station 100 to control an aircraft which is in an emergency situation, the processor 340 may be configured to preferentially perform control of the aircraft.

The above-described communication devices 110, 210, and 310, which are hardware devices implemented with various electronic circuits to transmit and receive signals through wired or wireless connections, may be configured to transmit and receive information with in-vehicle devices based on in-vehicle network communication technology, and may be configured to communicate with the outside through a mobile communication module, a wireless Internet module, and a short range communication module.

The mobile communication module may be configured to perform communication through a mobile communication network established according to technical standards or communication methods for mobile communication (e.g., Global System for Mobile communication (GSM), Code Division Multi access (CDMA), Code Division Multi Access 2000 (CDMA 2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), 4th Generation mobile telecommunication (4G), 5th Generation mobile telecommunication (5G), etc.

The wireless Internet module refers to a module for wireless Internet access, and may be configured to perform communication through Wireless LAN (WLAN), Wireless-Fidelity (Wi-Fi), Wi-Fi direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), Long Term Evolution-Advanced (LTE-A), etc.

The short-range communication module may support short-range communication by using at least one of Bluetooth™, Radio Frequency Identification (RFID), Infrared Data Association (IrDA), ultra wideband (UWB), ZigBee, Near Field Communication (NFC), a Wireless Universal Serial Bus (USB) technique, or any combination thereof.

The storages 120, 220, and 320 may each include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface devices 130 and 330 may each include an input means for receiving a control command from a user and an output means for outputting an operation state of the apparatus and results thereof. Herein, the input means may include a key button, and may include a mouse, a joystick, a jog shuttle, a stylus pen, and the like. Furthermore, the input means may include a soft key implemented on the display.

The output device may include a display, and may also include a voice output means such as a speaker. In the instant case, in a response to a case that a touch sensor formed of a touch film, a touch sheet, or a touch pad is provided on the display, the display may operate as a touch screen, and may be implemented in a form in which an input device and an output device are integrated.

In the instant case, the display may include at least one of a liquid crystal display (LCD), a thin film transistor liquid crystal display (TFT LCD), an organic light-emitting diode display (OLED display), a flexible display, a field emission display (FED), and a 3D display.

Figure 5:
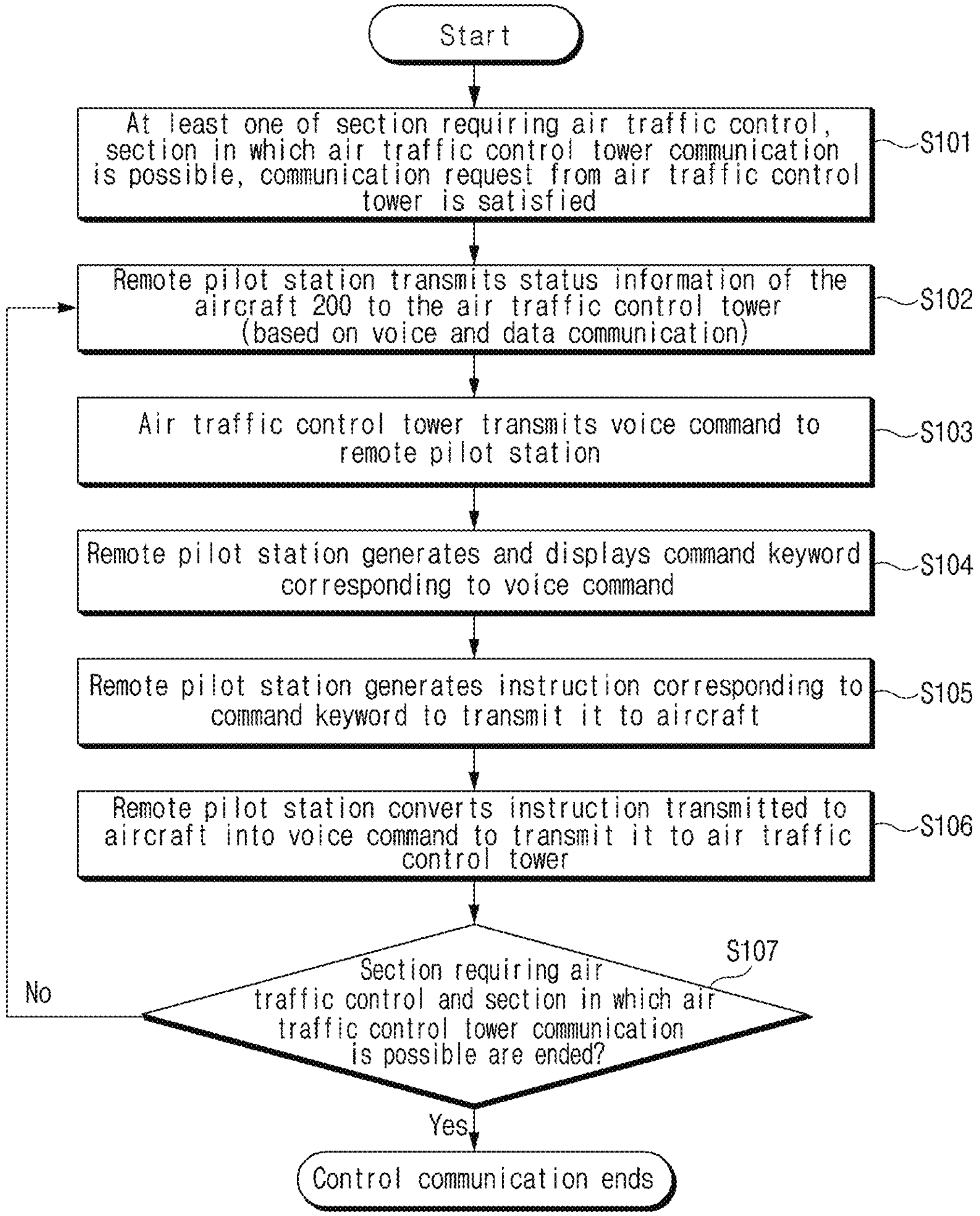
FIG. 5 illustrates a flowchart showing an example automatic control method for an aircraft.

Hereinafter, an automatic control method for an aircraft according to an exemplary embodiment of the present disclosure will be described with reference to FIG. 5. FIG. 5 illustrates a flowchart for describing an example automatic control method for an aircraft.

Hereinafter, it is assumed that an automatic control system for an aircraft in FIG. 1 performs a process of FIG. 5. Furthermore, in the description of FIG. 5, operations described as being performed by a device may be understood as being controlled by the processors 140, 230, and 340 of each device in the automatic control system for the aircraft. In following exemplary embodiments, operations of steps S101 to S107 may be performed sequentially, but are not necessarily performed sequentially. For example, an order of each operation may be changed, and at least two operations may be performed in parallel.

Referring to FIG. 5, in response to a section that requires air traffic control, a section where air traffic control tower communication is possible, or a communication request from air traffic control tower 300 (S101), the remote pilot station 100 may be configured to transmit status information of the aircraft 200 to the air traffic control tower 300 (S102). In the instant case, the remote pilot station 100 may be configured to receive status information of the aircraft 200 at predetermined intervals from the aircraft 200, and may be configured to convert the status information of the aircraft 200 into voice information to transmit it to the air traffic control tower 300. Furthermore, the remote pilot station 100 may be configured to transmit the status information of the aircraft 200 to the air traffic control tower 300 as data information as well as voice information.

Accordingly, the air traffic control tower 300 may be configured to display data information among the status information of the aircraft 200 received from the aircraft 200 on a screen, may configured to output voice information through a speaker so that a control manager may check the status information of the aircraft 200, and may configured to transmit a voice command that matches the status information of the aircraft 200 to the aircraft 200 (S103). In the instant case, the air traffic control tower 300 may be configured to transmit the voice command inputted from the control manager to the aircraft 200.

Accordingly, the remote pilot station 100 may be configured to generate a command keyword (data information) corresponding to the voice command received from the air traffic control tower 300 and display it on the screen so that a remote pilot may check the command keyword (S104), and may be configured to receive an instruction corresponding to the command keyword from the remote pilot and to transmit the instruction to the aircraft 200 (S105). For example, the command keyword may include a runway, a gate, a speed, a descent angle, a landing time, etc., and in response to a case where the command keyword is "the landing time," the remote pilot may input the instruction "land at 2 o'clock", and this instruction may be transmitted to the aircraft 200.

The remote pilot station 100 may convert the instruction transmitted to the aircraft 200 into voice information to transmit the instruction converted into voice information to the air traffic control tower 300 (S106).

Thereafter, the remote pilot station 100 may be configured to determine whether the section requiring air traffic control or the section in which air traffic control tower communication is possible ends (S107), and may be configured to end air traffic control communication in response to the end of the section requiring air traffic control or the section in which air traffic control tower communication is possible ends.

In response to a case where the section requiring air traffic control or the section in which air traffic control tower communication is possible has not ended, the above steps S102 to S107 may be repeated until the section requiring air traffic control or the section in which air traffic control tower communication is possible ends.

Figure 6:
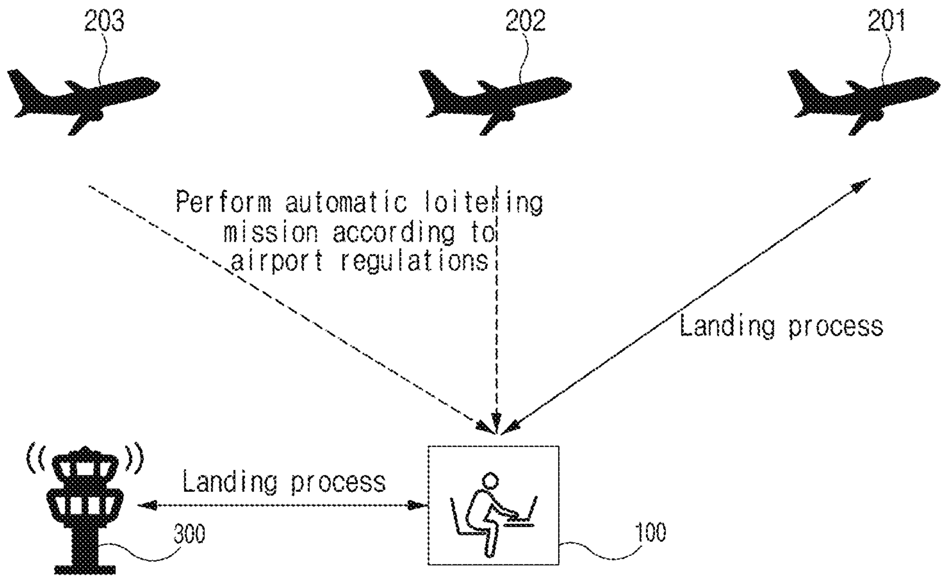
FIG. 6 illustrates another example of a configuration of an automatic control system for an aircraft.
Figure 7:
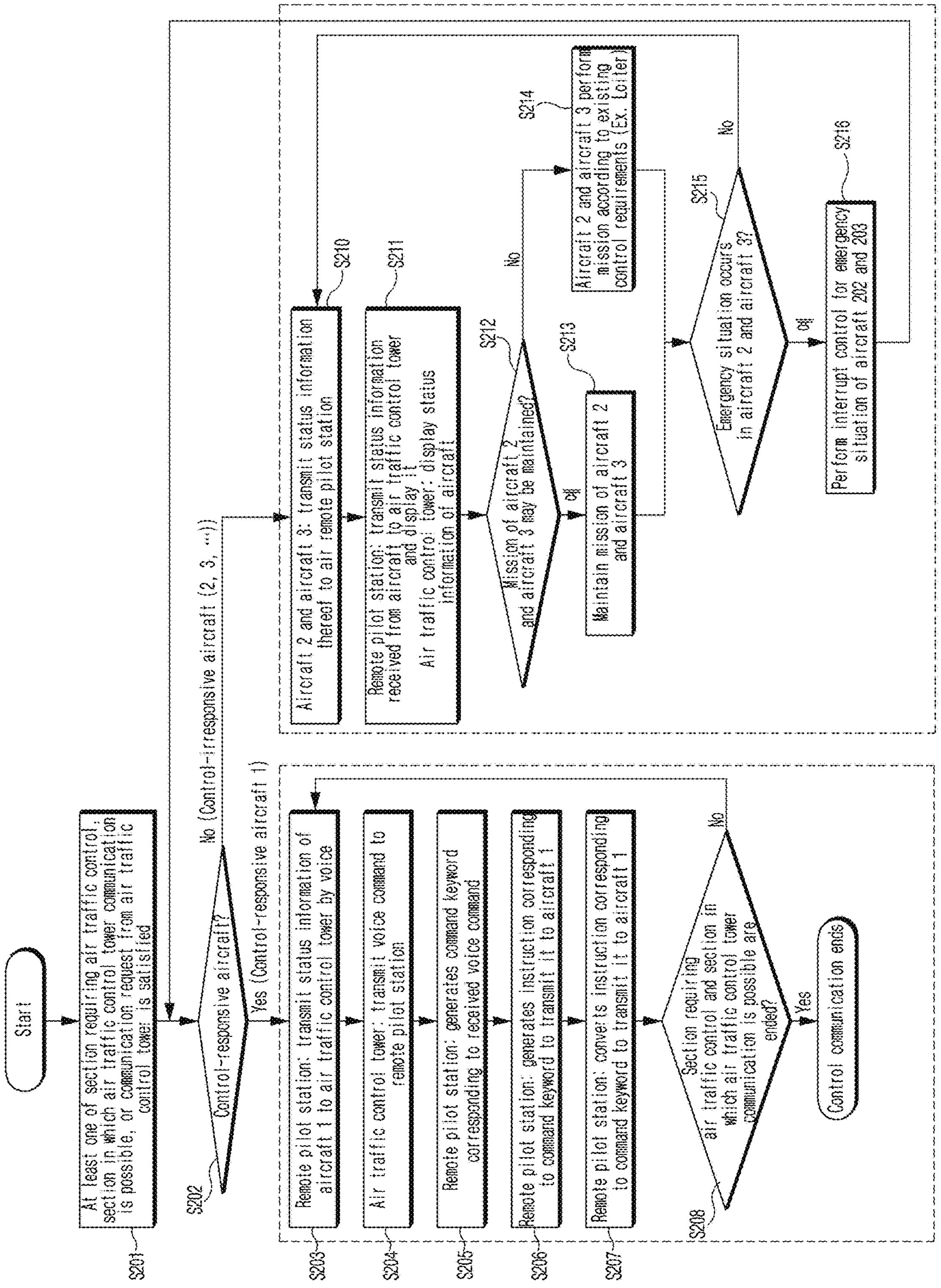
FIG. 7 illustrates a flowchart showing another example automatic control method for an aircraft.

Hereinafter, an automatic control method for an aircraft according to an exemplary embodiment of the present disclosure will be described in detail with reference to FIG. 6 and FIG. 7. FIG. 6 illustrates an example of a configuration of an automatic control system for an autonomous flight gas, and FIG. 7 illustrates another flowchart for describing an example automatic control method for an aircraft.

Hereinafter, it is assumed that the remote pilot station 100 of FIG. 6, the aircraft 201, 202, and 203, and the air traffic control tower 300 perform the process of FIG. 7. Furthermore, in the description of FIG. 7, operations described as being performed by a device may be understood as being controlled by the processors 140, 230, and 340 of each device in the automatic control system for the aircraft. In following exemplary embodiments, operations of steps S201 to S216 may be performed sequentially, but are not necessarily performed sequentially. For example, an order of each operation may be changed, and at least two operations may be performed in parallel.

In FIG. 6, in response to a case where the multiple aircraft 201, 202, and 203 are remotely controlled by one remote pilot station 100, the first aircraft 201 may preferentially be a control target, and the aircraft 202 and 203 may be configured to perform a same previous mission and wait until they become the control target.

That is, in response to a case where one remote pilot station 100 controls a plurality of aircraft 201, 202, and 203, it may be difficult to control all the aircraft together, so it may be controlled to control sequentially them according to a predetermined priority.

Among the plurality of aircraft, one first aircraft 201 designated by the remote pilot may be preferentially controlled. In the instant case, the plurality of aircraft 201, 202, and 203 may be configured to all transmit their status information to the remote pilot station 100, and the remote pilot station 100 may be configured to display the received status information of the plurality of aircraft 201, 202, and 203 on a screen. Furthermore, the remote pilot station 100 may be configured to transmit the received status information of the plurality of aircraft 201, 202, and 203 to the air traffic control tower 300, and the air traffic control tower 300 may be configured to display the status information of the plurality of aircraft 201, 202, and 203 received from the remote pilot station 100 on the screen.

In the instant case, while the first aircraft 201 designated as a control target is controlled by the air traffic control tower 300, the aircraft 202 and 203 which are not designated as control targets may continue to perform a same mission (e.g., cruising) which they were previously performing. However, in response to a case where it is impossible for aircraft 202 and 203, which are not designated as control targets, to perform the same mission they were previously performing, existing control regulations may be complied with. For example, in response to a case where the mission which the aircraft 202 and 203 were previously performing was cruising, but they had to land, the aircrafts 202 and 203 do not perform previous missions but rather loiter over the airport according to existing air traffic control regulations.

Thereafter, in response to a case where control of the first aircraft 201 is completed, control of the second aircraft 202, which is of a next highest priority, may be started. In the instant case, control target ranking may be arbitrarily determined by a remote pilot or determined according to predetermined rules.

Furthermore, in response to a case where an emergency situation occurs in the second aircraft 202 which is on standby during control of the first aircraft 201, an interrupt signal may be transmitted to the remote pilot station 100 and the air traffic control tower 300 to prioritize control of the second aircraft 202 in which an emergency situation has occurred. In the instant case, in response to a case where an emergency responsive control manager is deployed to control the second aircraft 202 in an emergency situation, or there is no emergency responsive control manager, control of the first aircraft 201 may be completed and then control of the second aircraft 202 may be performed.

For example, in response to controlling the landing of the first aircraft 201 designated as a control target as shown in FIG. 6, the remaining aircraft 202 and 203 may perform automatic loitering missions in accordance with airport regulations.

Referring to FIG. 7, status information may be transmitted by voice to the air traffic control tower.

In response to a case where there is a communication request from the air traffic control tower 300 (S201) in a section requiring air traffic control or a section in which air traffic control tower communication is possible, the aircraft 200 may be configured to determine whether the aircraft is a control-responsive aircraft (S202).

In response to a case where the aircraft is the control-responsive aircraft, the control-responsive aircraft will be referred to as the first aircraft, and a control-irresponsive aircraft will be referred to as the second aircraft and the third aircraft.

The remote pilot station 100 may be configured to transmit status information of the first aircraft 201 received from the first aircraft 201 to the air traffic control tower 300 (S203). In this case, the status information of the first aircraft 201 may include voice information and data information.

Accordingly, the air traffic control tower 300 may be configured to display data information among the status information of the first aircraft 201 received from the first aircraft 201 on the screen, may configured to output voice information through a speaker so that a control manager may check the status information of the first aircraft 201, and may configured to transmit a voice command that matches the status information of the remote pilot station 100 (S204). In the instant case, the air traffic control tower 300 may be configured to receive a voice command that matches the status information of the first aircraft 201 from the control manager to transmit it to the remote pilot station 100.

Accordingly, the remote pilot station 100 may be configured to generate a data communication-based command keyword corresponding to the voice command received from the air traffic control tower 300 to display it on the screen (S205).

Accordingly, the remote pilot may check the command keyword on the screen, and the remote pilot station 100 may be configured to receive an instruction matching the command keyword by the remote pilot to transmit the instruction to the first aircraft 201 (S206).

Accordingly, the remote pilot station 100 may be configured to convert the data communication-based command transmitted to the first aircraft 201 into voice information to transmit the converted voice information to the air traffic control tower 300 (S207). Accordingly, the control manager may check the instruction transmitted to the first aircraft 201.

Thereafter, the remote pilot station 100 may be configured to determine whether the section requiring air traffic control or the section in which air traffic control tower communication is possible ends (S208), and may be configured to end air traffic control communication in response to the end of the section requiring air traffic control or the section in which air traffic control tower communication is possible ends.

In response to a case where the section requiring air traffic control or the section in which air traffic control tower communication is possible has not ended, the above steps S202 to S208 may be repeated until the section requiring air traffic control or the section in which air traffic control tower communication is possible ends.

Meanwhile, in step S202, the remaining aircraft 202 and 203 that are not designated as control targets among the plurality of aircraft 201, 202, and 203 may be configured to transmit their status information to the remote pilot station 100 (S210).

The remote pilot station 100 may be configured to transmit status information of the aircraft 202 and 203 received from the aircraft 202 and 203 to the air traffic control tower 300, the air traffic control tower 300 and the remote pilot station 100 may be configured to display the status information of the aircraft 202 and 203 received from the aircraft 202 and 203 (S211), and the remote pilot station 100 may be configured to determine whether mission of the aircraft 202 and 203 may be maintained (S212).

In response to a case where the mission of the aircraft 202 and 203 may be maintained, the remote pilot station 100 may be configured to remotely control the aircraft 202 and 203 to maintain their mission (S213), and in response to a case where it is impossible to maintain the mission of aircraft 202 and 203, the remote pilot station 100 may perform the mission of the aircraft 202 and 203 according to existing control regulations (S214).

Meanwhile, the remote pilot station 100 may monitor whether an emergency situation occurs in the aircraft 202 and 203 (S215), and in the event of the emergency situation in the aircraft 202 or 203, may be linked with the air traffic control tower 300 to perform interrupt control to control the emergency situation of the aircraft 202 and/or 203. In the instant case, the remote pilot station 100 may monitor the emergency situation through periodic communication with the aircraft 202 and/or 203. For example, in the event of an emergency situation in the second aircraft 202, control of the second aircraft 202 may be performed through another control manager who responds to the emergency situation instead of the control manager who was controlling the first aircraft 201 at the air traffic control tower 300. Furthermore, in response to a case where no other controller exists to respond to an emergency situation, the control manager who was controlling the first aircraft 201 may perform control of the second aircraft 202 after ending control of the first aircraft 201.

Furthermore, in response to a case where the first aircraft 201 designated as a control target is controlled through the processes of steps S202 to S209, the aircraft 202 and 203 which are not designated as control targets may perform the processes of S210 to S216 in parallel.

Accordingly, according to the present disclosure, human error may be minimized through voice communication by displaying necessary information on the screen through data communication as well as voice communication between the control manager of the air traffic control tower 300 and a remote pilot of the remote pilot station 100.

Furthermore, according to the present disclosure, a control time may be minimized, airport congestion may be reduced, and work fatigue of control managers and remote pilots may be minimized by automating the control of aircraft based on voice information generation through natural language processing (NLP) and command generation based on voice information, minimizing communication delay due to voice communication.

Figure 8:
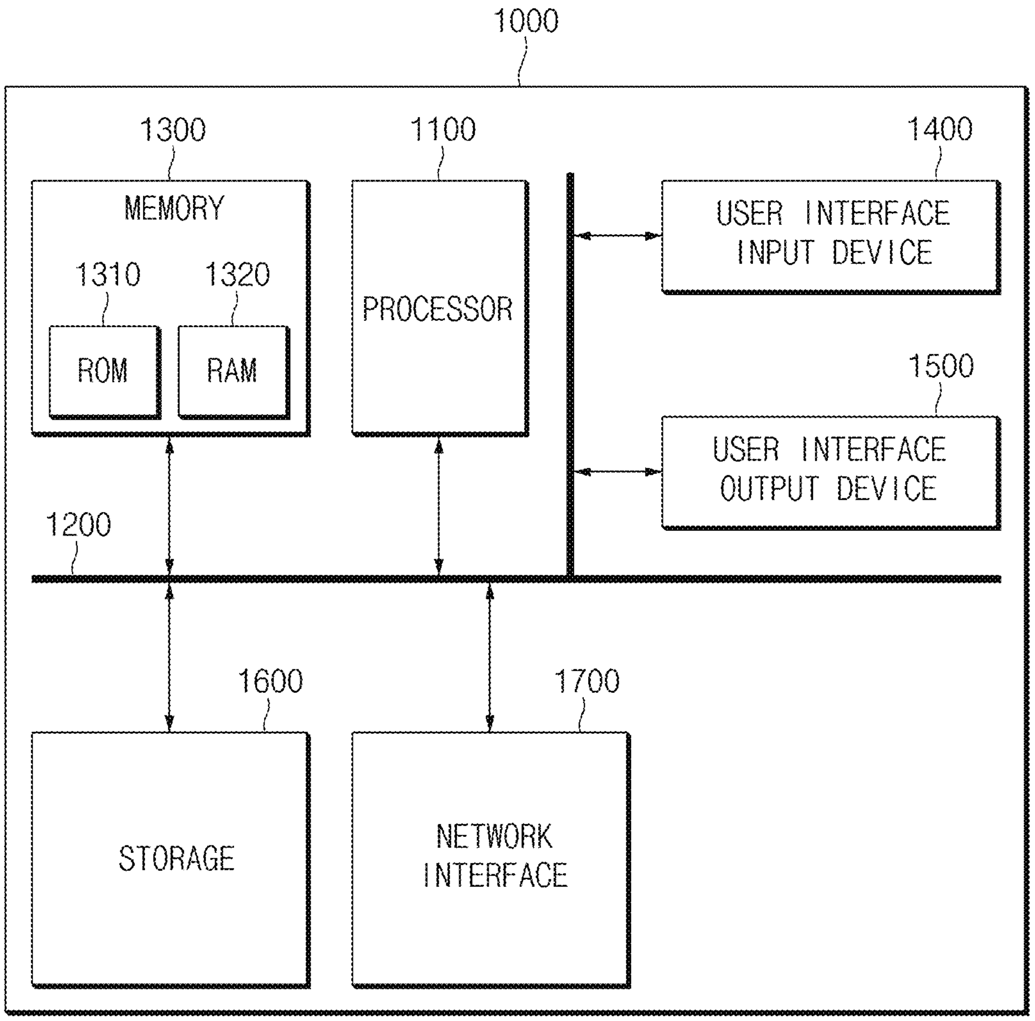
FIG. 8 illustrates an example computing system.

FIG. 8 illustrates an example computing system.

Referring to FIG. 8, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that is configured to perform processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments included herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which may read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. A remote pilot station comprising:

a communication device configured to communicate with an aircraft and an air traffic control tower configured to control the aircraft; and a processor configured to:

receive status information of the aircraft from the aircraft;

convert the status information of the aircraft into first voice information based on a natural language processing technique;

transmit the first voice information to the air traffic control tower;

convert a voice command received from the air traffic control tower into a command keyword;

generate an instruction corresponding to the command keyword that is configured to remotely control the aircraft;

control the aircraft using the generated instruction, wherein the controlling of the aircraft using the generated instruction comprises the processor being configured to:

transmit, to the aircraft, the generated instruction to remotely control the aircraft;

convert the generated instruction corresponding to the command keyword into second voice information; and transmit the second voice information to the air traffic control tower.

2. The remote pilot station of claim 1, wherein the processor is configured to transmit the received status information of the aircraft, as data information, to the air traffic control tower along with the first voice information.

3. The remote pilot station of claim 1, further comprising an interface device configured to display the command keyword on a screen.

4. The remote pilot station of claim 3, wherein the interface device is configured to receive an instruction from a remote pilot.

5. The remote pilot station of claim 1, wherein the processor is configured to periodically receive the status information of the aircraft from the aircraft at predetermined intervals.

6. The remote pilot station of claim 5, wherein the processor is configured to communicate with the air traffic control tower to request that the air traffic control tower performs priority control of the aircraft when an emergency occurs in the aircraft.

7. The remote pilot station of claim 1, wherein the processor is configured to:

initiate the control of the aircraft in response to satisfying at least one of a section requiring air traffic control, a section where air traffic control communication is possible for the air traffic control tower, and a communication request for the air traffic control tower.

8. An automatic control system comprising:

an aircraft; and a remote pilot station configured to remotely control the aircraft based on communication with an air traffic control tower, wherein the remote pilot station is configured to:

receive status information of the aircraft from the aircraft;

convert the status information of the aircraft into first voice information based on a natural language processing technique;

transmit the first voice information to the air traffic control tower; and convert a voice command received from the air traffic control tower into a command keyword;

generate an instruction corresponding to the command keyword that is configured to remotely control the aircraft;

control the aircraft using the generated instruction, wherein the controlling of the aircraft using the generated instruction comprises the remote pilot station being configured to:

transmit, to the aircraft, the generated instruction to remotely control the aircraft;

convert the generated instruction corresponding to the command keyword into second voice information; and transmit the second voice information to the air traffic control tower.

9. The automatic control system of claim 8, wherein the aircraft includes multiple aircrafts, and wherein the remote pilot station is configured to:

transmit an instruction to a first aircraft designated as a control target among the multiple aircrafts; and control a second aircraft, which is not designated as the control target among the multiple aircrafts, to continue performing a previously assigned mission.

10. The automatic control system of claim 9, wherein the remote pilot station is configured to:

display status information of the second aircraft on a screen; and transmit the status information of the second aircraft to the air traffic control tower.

11. The automatic control system of claim 9, wherein the second aircraft is configured to transmit status information to the remote pilot station at predetermined intervals.

12. The automatic control system of claim 11, wherein the remote pilot station comprises a processor, and wherein the processor is configured to control the second aircraft to continue performing the previously assigned mission according to airport control regulations.

13. The automatic control system of claim 9, wherein the remote pilot station is configured to request the air traffic control tower to preferentially control the second aircraft when the second aircraft experiences an emergency situation.

14. The automatic control system of claim 9, wherein the remote pilot station is configured to determine control priority of the multiple aircrafts based on status information of the multiple aircrafts.

15. An automatic control method for an aircraft, the method comprising:

receiving, by a processor, status information of the aircraft from the aircraft;

converting, by the processor, the received status information of the aircraft into first voice information based on a natural language processing technique;

transmitting, by the processor, the first voice information to an air traffic control tower which controls the aircraft;

converting, by the processor, a voice command received from the air traffic control tower into a command keyword;

generating, by the processor, an instruction corresponding to the command keyword that is configured to remotely control the aircraft;

controlling, by the processor, the aircraft using the generated instruction, wherein the controlling of the aircraft using the generated instruction comprises:

transmitting, by the processor and to the aircraft, the generated instruction that is configured to remotely control the aircraft;

converting, by the processor, the generated instruction corresponding to the command keyword into second voice information; and transmitting, by the processor, the second voice information to the air traffic control tower.

16. The automatic control method of claim 15, further comprising:

displaying, by the processor, the command keyword on a screen; and receiving, by the processor, an instruction matching the command keyword from a remote pilot.

17. The automatic control method of claim 15, further comprising transmitting, by the processor, the received status information of the aircraft, as data information, to the air traffic control tower along with the first voice information.

18. The automatic control method of claim 15, further comprising periodically receiving, by the processor, the status information of the aircraft from the aircraft at predetermined intervals to monitor a status of the aircraft.

19. The automatic control method of claim 15, further comprising requesting, by the processor, that the air traffic control tower performs priority control of the aircraft when an emergency occurs in the aircraft.

20. The automatic control method of claim 15, further comprising:

initiating the control of the aircraft in response to satisfying at least one of a section requiring air traffic control, a section where air traffic control communication is possible for the air traffic control tower, and a communication request for the air traffic control tower.

* * * * *